US012756593B2

(12) United States Patent
Peng

(10) Patent No.: US 12,756,593 B2
(45) Date of Patent: Oct. 6, 2026

(54) MESSAGE SENDING METHOD AND APPARATUS, MESSAGE RECEIVING METHOD AND APPARATUS, AND STORAGE MEDIUM

(71) Applicant: ZTE Corporation, Shenzhen (CN)

(72) Inventor: Shaofu Peng, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 391 days.

(21) Appl. No.: 18/286,801

(22) PCT Filed: Jan. 5, 2022

(86) PCT No.: PCT/CN2022/070343
§ 371 (c)(1),
(2) Date: Oct. 13, 2023

(87) PCT Pub. No.: WO2022/227690
PCT Pub. Date: Nov. 3, 2022

(65) Prior Publication Data
US 2024/0195657 A1 Jun. 13, 2024

(30) Foreign Application Priority Data
Apr. 28, 2021 (CN) ......................... 202110469912.3

(51) Int. Cl.
*H04L 12/46* (2006.01)
*H04L 12/66* (2006.01)

(52) U.S. Cl.
CPC .......... *H04L 12/4633* (2013.01); *H04L 12/66* (2013.01)

(58) Field of Classification Search
None
See application file for complete search history.

(56) References Cited

U.S. PATENT DOCUMENTS

2008/0170578 A1* 7/2008 Ould-Brahim ...... H04L 12/4641 370/401
2015/0381493 A1* 12/2015 Bansal .................. H04L 45/745 370/392

FOREIGN PATENT DOCUMENTS

CN 106789748 A 5/2017
CN 107872392 A 4/2018
(Continued)

OTHER PUBLICATIONS

International Search Report for corresponding application PCT/CN2022/070343 issued on Mar. 28, 2024.
(Continued)

*Primary Examiner* — Angela Nguyen
(74) *Attorney, Agent, or Firm* — CANTOR COLBURN LLP

(57) ABSTRACT

Provided are a message sending method and apparatus, a message receiving method and apparatus, and a storage medium. The message sending method includes: sending, by an egress node, a Border Gateway Protocol (BGP) update message to an ingress node to notify the ingress node of routing reachability information, wherein the BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

16 Claims, 4 Drawing Sheets

(56) References Cited

FOREIGN PATENT DOCUMENTS

| | | |
|---|---|---|
| CN | 112291147 A | 1/2021 |
| CN | 112511329 A | 3/2021 |

OTHER PUBLICATIONS

Vairavakkalai, K. et al.; "BGP Classful Transport Planes draft-kaliraj-idr-bgp-classful-transport-planes-00";Internet Engineering Task Force (IETF); Network Working Group: Internet-Draft ; May 7, 2020 (May 7, 2020).

International Search Report for corresponding application PCT/CN2022/070343 filed Jan. 5, 2022; Mail date Mar. 28, 2022.

Chinese Office Action for corresponding application 202110469912.3: Mail date May 26, 2026.

* cited by examiner

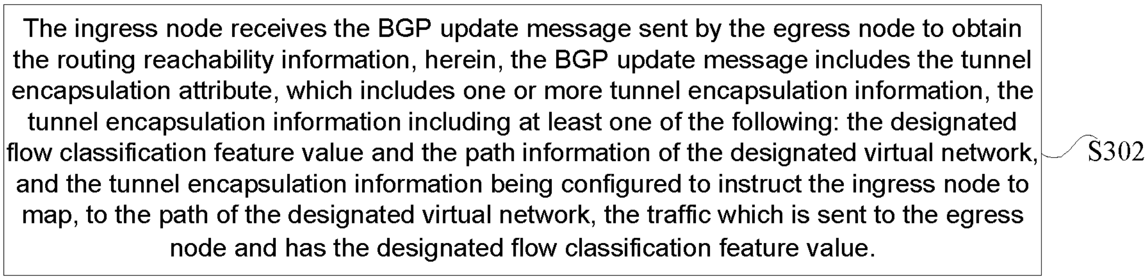

Fig. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            Reserved           |
+-+-+-+-+-+-+-+-+-+-+-+-+-+-+-+-+-+-+-+-+-+-+-+-+-+-+-+-+-+-+-+-+
|                        sub-sub-TLVs...                        |
+-+-+-+-+-+-+-+-+-+-+-+-+-+-+-+-+-+-+-+-+-+-+-+-+-+-+-+-+-+-+-+-+
```

Fig. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |   DS Begin    |    DS End     |
+-+-+-+-+-+-+-+-+-+-+-+-+-+-+-+-+-+-+-+-+-+-+-+-+-+-+-+-+-+-+-+-+
```

Fig. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |V|   Flags     | Prefix Length |
+-+-+-+-+-+-+-+-+-+-+-+-+-+-+-+-+-+-+-+-+-+-+-+-+-+-+-+-+-+-+-+-+
|       IPv4 Prefix (32 bits) or IPv6 Prefix (128bits)          |
+-+-+-+-+-+-+-+-+-+-+-+-+-+-+-+-+-+-+-+-+-+-+-+-+-+-+-+-+-+-+-+-+
```

Fig. 6

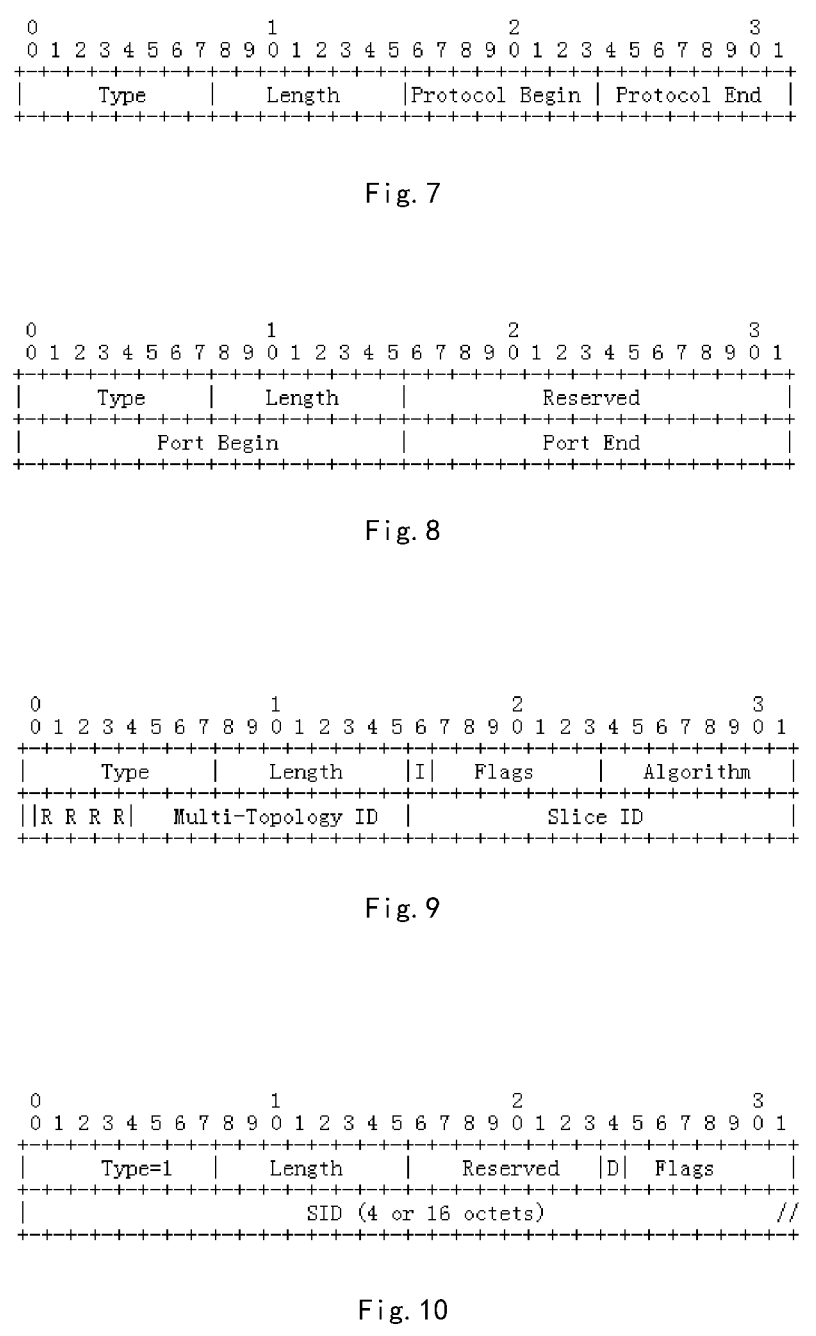

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |Protocol Begin | Protocol End  |
+-+-+-+-+-+-+-+-+-+-+-+-+-+-+-+-+-+-+-+-+-+-+-+-+-+-+-+-+-+-+-+-+
```

Fig. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            Reserved           |
+-+-+-+-+-+-+-+-+-+-+-+-+-+-+-+-+-+-+-+-+-+-+-+-+-+-+-+-+-+-+-+-+
|          Port Begin           |            Port End           |
+-+-+-+-+-+-+-+-+-+-+-+-+-+-+-+-+-+-+-+-+-+-+-+-+-+-+-+-+-+-+-+-+
```

Fig. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |I|   Flags     |   Algorithm   |
+-+-+-+-+-+-+-+-+-+-+-+-+-+-+-+-+-+-+-+-+-+-+-+-+-+-+-+-+-+-+-+-+
||R R R R|  Multi-Topology ID   |           Slice ID            |
+-+-+-+-+-+-+-+-+-+-+-+-+-+-+-+-+-+-+-+-+-+-+-+-+-+-+-+-+-+-+-+-+
```

Fig. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type=1     |    Length     |   Reserved    |D|   Flags     |
+-+-+-+-+-+-+-+-+-+-+-+-+-+-+-+-+-+-+-+-+-+-+-+-+-+-+-+-+-+-+-+-+
|                      SID (4 or 16 octets)                    //
+-+-+-+-+-+-+-+-+-+-+-+-+-+-+-+-+-+-+-+-+-+-+-+-+-+-+-+-+-+-+-+-+
```

Fig. 10

MESSAGE SENDING METHOD AND APPARATUS, MESSAGE RECEIVING METHOD AND APPARATUS, AND STORAGE MEDIUM

The disclosure claims priority to Chinese Patent Application No. 202110469912.3, filed with the China National Intellectual Property Administration on Apr. 28, 2021 and entitled "Message Sending Method and Apparatus, Message Receiving Method and Apparatus, and Storage Medium", the disclosure of which is hereby incorporated by reference in its entirety.

TECHNICAL FIELD

The disclosure relates to the field of communications, in particular to a message sending method and apparatus, a message receiving method and apparatus, and a storage medium.

BACKGROUND

How to deploy network slices in carrier networks has been lively discussed and highly concerned by the industry. Some existing control plane technologies will be fully utilized, and some new technologies have been developed to meet the requirements for the network slices in different scenarios. Generally, the network slice may be a virtual network with dedicated resources reserved, or a traffic engineering path with dedicated resources reserved. It may be a strict hard isolation of resources, or a soft isolation that achieves an approximate hard isolation effect between the different network slices. Internet Protocol (IP) packet networks were never designed to support the hard isolation, but rather statistical multiplexing, which is more economical than private or Time Division Multiplex (TDM) networks. At present, various technical solutions have been proposed by the industry to support the requirements for the network slices in the IP packet networks, for example, some use an Interior Gateway Protocol (IGP) Multi-Topology (MT) technology (referring to RFC5120, RFC4915, and RFC5340) to divide the same physical network topology into multiple logical sub-topologies, each of which has dedicated resources: some use an IGP flexible algorithm (Flex-algo) technology (referring to draft-ietf-lsr-flex-algo-14 and draft-ietf-lsr-ip-flexalgo-00) to divide the same physical network topology into multiple Flex-algo planes, and in each Flex-algo plane, a corresponding algorithm is used to calculate a forwarding path with constraints: and others directly create multiple end-to-end virtual topologies (referring to draft-peng-teas-network-slicing-04) with different slice Identifiers (IDs) in the network, and then establish end-to-end paths in the virtual topologies of the slices.

After the network slice is created, a corresponding traffic mapping strategy usually needs to be configured on an ingress node of the slice to guide the received specific traffic to a specific slice for forwarding. For example, an Access Control List (ACL) rule is configured on the ingress node of the slice, and feature values such as quintuples of the traffic (a source IP address, a destination IP address, a source port number, a destination port number, and a protocol number) or a Traffic Class (TC) are matched to directly guide the traffic to the specific slice, or a certain Color (definition of Color refers to draft-ietf-idr-tunnel-encaps-22) value is first obtained by mapping according to these feature values, and then the corresponding slice is selected according to the Color value. However, such manual configuration is not flexible, especially for a scenario where the ingress node of the slice is not an end-to-end service landing node, at this time, it is not recommended to configure a large number of service-related policies on the ingress node of the slice.

For the problems of inflexibility caused by dependency on a manually configured slice for traffic guidance during network operation and maintenance, etc., in the related technologies, no effective technical solution has been proposed.

SUMMARY

Embodiments of the disclosure provide a message sending method and apparatus, a message receiving method and apparatus, and a storage medium, so as to solve the problems of inflexibility caused by dependency on a manually configured slice for traffic guidance during network operation and maintenance, etc.

According to one aspect of the embodiments of the disclosure, a message sending method is provided, which includes that: an egress node sends a Border Gateway Protocol (BGP) update message to an ingress node to notify the ingress node of routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

According to another aspect of the embodiments of the disclosure, a message receiving method is also provided, which includes that: an ingress node receives a BGP update message sent by an egress node to obtain routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

According to yet another aspect of the embodiments of the disclosure, a message sending apparatus is also provided, which includes: a sending module, configured to send a BGP update message to an ingress node to notify the ingress node of routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

According to still another aspect of the embodiments of the disclosure, a message receiving apparatus is also provided, which includes: a receiving module, configured to receive a BGP update message sent by an egress node to obtain routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

According to still another aspect of the embodiments of the disclosure, a computer readable storage medium is also provided, in which a computer program is stored. When running, the computer program is configured to perform the message sending method or the message receiving method.

According to still another aspect of the embodiments of the disclosure, an electronic device is also provided, which includes: a memory, a processor, and a computer program stored in the memory and runnable on the processor. The processor performs the message sending method or the message receiving method through the computer program.

Through the disclosure, the egress node sends the BGP update message to the ingress node to notify the ingress node of the routing reachability information. The BGP update message includes the tunnel encapsulation attribute, which including one or more pieces of tunnel encapsulation information, the tunnel encapsulation information including at least one of the following: the designated flow classification feature value and the path information of the designated virtual network, and the tunnel encapsulation information being configured to instruct the ingress node to map, to the path of the designated virtual network, the traffic which is sent to the egress node and has the designated flow classification feature value. That is, the egress node sends the BGP update message containing the designated flow classification feature value and the path information of the designated virtual network to the ingress node to notify the ingress node of the routing reachability information, and then the ingress node may map, to the path of the designated virtual network, the traffic which is sent to the egress node and has the designated flow classification feature value. The problems of inflexibility caused by dependency on the manually configured slice for traffic guidance during network operation and maintenance, etc. are solved, and then the egress node sends the BGP update message to the ingress node to notify the ingress node of the routing reachability information, which makes up for the defect of incapability of specifying a specific virtual network when notifying a BGP route, and achieves automatic slice traffic guidance without depending on static configuration, so that the flexibility is good.

BRIEF DESCRIPTION OF THE DRAWINGS

The drawings described herein are used to provide a further understanding of the disclosure, and constitute a part of the disclosure, and the exemplary embodiments of the disclosure and the description thereof are used to explain the disclosure, but do not constitute improper limitations to the disclosure. In the drawings:

FIG. 3 is a flowchart of a message receiving method according to an embodiment of the disclosure.

FIG. 4 is a schematic diagram of a format of a Flow Classification Sub-Type Length Value (TLV) according to an embodiment of the disclosure.

FIG. 5 is a schematic diagram of a format of an IP DS sub-sub-TLV according to an embodiment of the disclosure.

FIG. 6 is a schematic diagram of a format of an IP Source Address Range sub-sub-TLV according to an embodiment of the disclosure.

FIG. 7 is a schematic diagram of an IP Protocol Number sub-sub-TLV according to an embodiment of the disclosure.

FIG. 8 is a schematic diagram of a format of a Transport Source Port Range sub-sub-TLV according to an embodiment of the disclosure.

FIG. 9 is a schematic diagram of a format of a Virtual Network Sub-TLV according to an embodiment of the disclosure.

FIG. 10 is a schematic diagram of a format of a Segment Routing (SR)-Best-Effort (BE) Encapsulation Sub-TLV according to an embodiment of the disclosure.

DETAILED DESCRIPTION OF THE EMBODIMENTS

In order to make the solutions of the disclosure understood by those skilled in the art, the technical solutions in the embodiments of the disclosure will be clearly and completely described below in combination with the drawings in the embodiments of the disclosure. It is apparent that the described embodiments are not all embodiments but only part of embodiments of the disclosure. All other embodiments obtained by those of ordinary skill in the art on the basis of the embodiments in the disclosure without creative work shall fall within the scope of protection of the disclosure.

It is to be noted that terms "first", "second" and the like in the description, claims and the above drawings of the disclosure are used for distinguishing similar objects rather than describing a designated sequence or a precedence order. It should be understood that the data used in such a way may be exchanged where appropriate, in order that the embodiments of the disclosure described here may be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Figure 1:
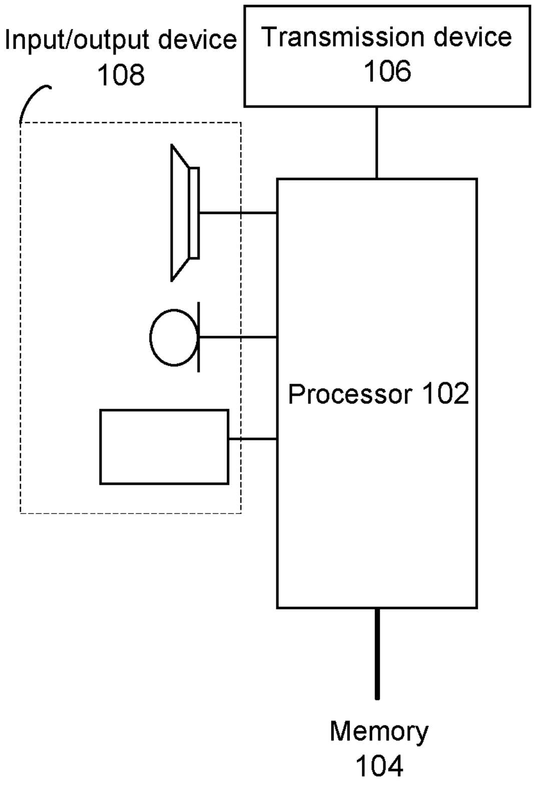
FIG. 1 is a structural block diagram of hardware of a computer terminal of a message sending method or a message receiving method according to an embodiment of the disclosure.

The method embodiments provided by the embodiments of the disclosure may be implemented in a computer terminal or a similar computing device. Taking running on the computer terminal as an example, FIG. 1 is a structural block diagram of hardware of a computer terminal of a message sending method or a message receiving method according to an embodiment of the disclosure. As shown in FIG. 1, the computer terminal may include one or more (only one is shown in FIG. 1) processors 102 (the processors 102 may include, but are not limited to, a Micro Processor Unit (MCU) or a Field Programmable Gate Array (FPGA), and other processing devices), and a memory 104 configured to store data. In an exemplary embodiment, the computer terminal may further include a transmission device 106 with a communication function and an input and output device 108. Those of ordinary skill in the art may understand that the structure shown in FIG. 1 is only schematic and not intended to limit the structure of the computer terminal. For example, the computer terminal may further include more or fewer components than those shown in FIG. 1, or has a different configuration with equivalent or more functions than those shown in FIG. 1.

The memory 104 may be configured to store a computer program, for example, a software program and a module of application software, for example, a computer program corresponding to the message sending method or the message receiving method in the embodiments of the disclosure. The processor 102 runs the computer program stored in the memory 104, thereby executing various functional applications and data processing, namely implementing the above method. The memory 104 may include a high speed Random Access Memory (RAM) and may further include a non-volatile memory such as one or more magnetic storage apparatuses, a flash memory, or other non-volatile solid state memories. In some examples, the memory 104 may further include memories remotely set relative to the processor 102, which may be connected to the computer terminal through the network. Examples of the network include, but are not limited to, the Internet, the Intranet, a local area network, a mobile communication network, and a combination thereof.

The transmission device 106 is configured to receive or send data through a network. A specific example of the network may include a wireless network provided by a communication provider of the computer terminal. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

Figure 2:
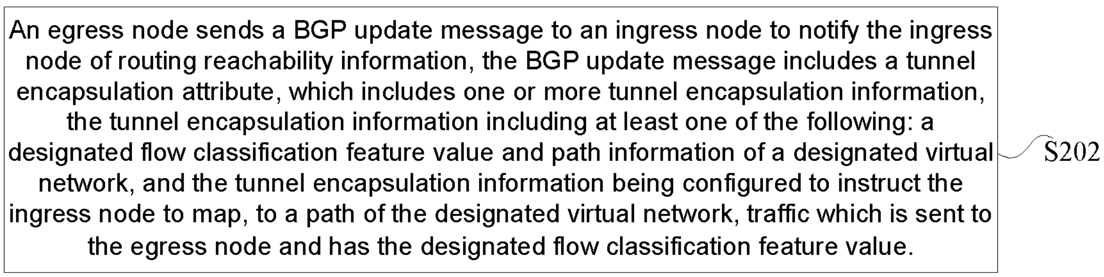
FIG. 2 is a flowchart of a message sending method according to an embodiment of the disclosure.

In the related technologies, draft-ietf-idr-tunnel-encaps-22 describes a method of carrying a tunnel encapsulation attribute in a BGP update message to specify tunnel encapsulation information of a route. Based on this, the disclosure discusses a method of specifying a forwarding path of a network slice. The method in the disclosure is also applicable to other application scenarios of non-network slices. Embodiments provide a message sending method, FIG. 2 is a flowchart of a message sending method according to an embodiment of the disclosure, and the flow includes the following step.

At S202, an egress node sends a BGP update message to an ingress node to notify the ingress node of routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

Through the above step, the egress node sends the BGP update message containing the designated flow classification feature value and the path information of the designated virtual network to the ingress node to notify the ingress node of the routing reachability information, and then the ingress node may map, to the path of the designated virtual network, the traffic which is sent to the egress node and has the designated flow classification feature value. The problems of inflexibility caused by dependency on a manually configured slice for traffic guidance during network operation and maintenance, etc. are solved, and then the egress node sends the BGP update message to the ingress node to notify the ingress node of the routing reachability information, which makes up for the defect of incapability of specifying a specific virtual network when notifying a BGP route, and achieves automatic slice traffic guidance without depending on static configuration, so that the flexibility is good.

It is to be noted that, the flow classification feature value includes at least one of the following: a Differentiated Services (DS) field of an IP header, a source IP address, a destination IP address, a source port number, a destination port number, and a protocol number of the IP header, and a source Media Access Control (MAC), a destination MAC address, a Virtual Local Area Network Identity Document (VLAN ID), and a Priority Code Point (PCP) of an Ethernet frame header.

Further, the DS field of the IP header includes at least one of the following: a Type of Service (TOS) field of an Internet Protocol Version 4 (IPv4) header, and a TC field of an Internet Protocol Version 6 (IPv6) header.

For better understanding, in the embodiment, the flow classification feature value is mainly the DS field of the IP header such as the TOS field of the IPV4 header or the TC field of the IPV6 header in a scenario of network slices. In addition, in other scenarios, the flow classification feature value may also be one of the source IP address, the destination IP address, the source port number, the destination port number, and the protocol number of the IP header, or any combination thereof or any combination with the DS field, and may also be any one of the source MAC, the destination MAC address, the VLAN ID, and the PCP of the Ethernet frame header, or any combination thereof.

Optionally, the path information of the designated virtual network includes at least one of the following: a path to a designated destination node in a designated IGP topology, a path to a designated destination node in a designated Flex-algo plane, a path to a designated destination node in a designated virtual topology corresponding to a designated Slice ID, and a path to a designated Segment Identifier (SID).

The embodiments provide a message receiving method, FIG. 3 is a flowchart of a message receiving method according to an embodiment of the disclosure, and the flow includes the following step.

At S302, an ingress node receives a BGP update message sent by an egress node to obtain routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

Through the above step, the ingress node receives the BGP update message which is sent by the egress node and contains the designated flow classification feature value and the path information of the designated virtual network to obtain the routing reachability information, and then the ingress node may map, to the path of the designated virtual network, the traffic which is sent to the egress node and has the designated flow classification feature value. The problems of inflexibility caused by dependency on a manually configured slice for traffic guidance during network operation and maintenance, etc. are solved, and then the BGP update message sent by the egress node is received through the ingress node to obtain the routing reachability information, which makes up for the defect of incapability of specifying the specific virtual network when notifying the BGP route, and achieves automatic slice traffic guidance without depending on static configuration, so that the flexibility is good.

It is to be noted that the flow classification feature value includes at least one of the following: a DS field of an IP header, a source IP address, a destination IP address, a source port number, a destination port number, and a protocol number of the IP header, and an MAC, a destination MAC address, a VLAN ID, and a PCP of an Ethernet frame header.

Further, the DS field of the IP header includes at least one of the following: a TOS field of an IPv4 header, and a TC field of an IPV6 header.

For better understanding, in the embodiment, the flow classification feature value is mainly the DS field of the IP header such as the TOS field of the IPV4 header or the TC field of the IPV6 header in a scenario of network slices. In addition, in other scenarios, the flow classification feature value may also be one of the source IP address, the destination IP address, the source port number, the destination port number, and the protocol number of the IP header, or any combination thereof or any combination with the DS field, and may also be any one of the source MAC, the destination MAC address, the VLAN ID, and the PCP of the Ethernet frame header, or any combination thereof.

Optionally, the path information of the designated virtual network includes at least one of the following: a path to a designated destination node in a designated IGP topology, a path to a designated destination node in a designated Flex-algo plane, a path to a designated destination node in a designated virtual topology corresponding to a designated Slice ID, and a path to a designated SID.

It is to be noted that, after the ingress node receives the BGP update message sent by the egress node to obtain the routing reachability information, the method further includes that: the ingress node creates a routing entry or a label entry corresponding to the ingress node according to the obtained routing reachability information. The routing entry or the label entry includes: the tunnel encapsulation attribute.

In this embodiment, after receiving the routing reachability information, the ingress node of the network creates the routing entry or the label entry corresponding to the ingress node to maintain the corresponding routing entry or label entry. The routing entry or the label entry contains corresponding tunnel encapsulation attribute information. It is to be noted that the tunnel encapsulation attribute information maintained in a single routing entry or label entry may contain multiple tunnel encapsulation options, such as <flow classification feature value 1, tunnel 1>, <flow classification feature value 2, tunnel 2>, etc.

Further, after the ingress node creates the routing entry or the label entry corresponding to the ingress node according to the obtained routing reachability information, the method further includes that: in a case of determining that the traffic is matched with the routing entry or the label entry, the ingress node obtains a flow classification feature of the traffic, and forwards the traffic on the path information of the designated virtual network corresponding to the flow classification feature.

In the embodiment, when the ingress node of the network receives the traffic from a user side, if the routing entry is matched and the routing entry contains the tunnel encapsulation attribute information, the traffic is further guided to the forwarding path of the designated virtual network for forwarding according to the flow classification feature of the received traffic.

For better understanding of the above solutions, in an optional embodiment, a message sending and receiving process specifically includes the following steps.

1) The egress node of the network (or through a reflector) sends the BGP update message to the ingress node to notify the routing reachability information, and a mechanism defined according to draft-ietf-idr-tunnel-encaps-22 may be used to contain the tunnel encapsulation attribute in the message. The tunnel encapsulation attribute may include one or more pieces of tunnel encapsulation information. Each tunnel encapsulation information contains a specific flow classification feature and path information of the specific virtual network mapped by the traffic. The flow classification feature value is mainly the DS field of the IP header, such as the TOS field of the IPV4 header or the TC field of the IPV6 header in a scenario of network slices. The path information of the specific virtual network may be a path to a specific destination node in a specific IGP topology, or a path to the specific destination node in a specific Flex-algo plane, or a path to the specific destination node in a specific virtual topology corresponding to a specific Slice ID, or a path to a specific SID (referring to RFC8402. In addition, in other scenarios, the flow classification feature value may also contain one of the source IP address, the destination IP address, the source port number, the destination port number, and the protocol number of the IP header, or any combination thereof or any combination with the DS field, and may also be any one of the source MAC, the destination MAC address, the VLAN ID, and the PCP of the Ethernet frame header, or any combination thereof.
2) After receiving a notification of the routing reachability information containing the tunnel encapsulation attribute, the ingress node of the network maintains the corresponding routing entry or label entry: The routing entry or the label entry contains the corresponding tunnel encapsulation attribute information. The tunnel encapsulation attribute information maintained in a single routing entry or label entry may contain multiple tunnel encapsulation options, such as <flow classification feature value 1, tunnel 1>, <flow classification feature value 2, tunnel 2>, etc.
3) When the ingress node of the network receives the traffic from the user side, if the routing entry or the label entry is matched and the routing entry or the label entry contains the tunnel encapsulation attribute information, the traffic is further guided to the forwarding path of the specific virtual network for forwarding according to the flow classification feature of the received traffic.

Further, for better understanding of the flow classification feature value contained in the tunnel encapsulation attribute, the specific implementation of draft-ietf-idr-tunnel-encaps-22 in the flow classification feature value contained in the tunnel encapsulation attribute is described as follows: FIG. 4 is a schematic diagram of a format of a Flow Classification Sub-TLV according to an embodiment of the disclosure, in a Tunnel Encapsulation TLV defined by draft-ietf-idr-tunnel-encaps-22, the Flow Classification Sub-TLV is added to represent flow classification information, and only the traffic matched with the flow classification information may use the designated tunnel encapsulation in the Tunnel Encapsulation TLV. The format of the Flow Classification Sub-TLV is shown in FIG. 4, where Type takes 1 byte and the value is to be assigned by an Internet Assigned Numbers Authority (IANA), indicating that the Sub-TLV is the Flow Classification Sub-TLV: and Length takes 1 byte and the value is set according to contained sub-sub-TLVs.

It is to be noted that many sub-sub-TLVs are defined, each sub-sub-TLV is optional and may exist alone or simultaneously, and the specific sub-sub-TLV is as follows.

a) IP DS Sub-Sub-TLV

The IP DS sub-sub-TLV is configured to represent the range of TCs that the traffic needs to be matched. FIG. 5 is a schematic diagram of a format of an IP DS sub-sub-TLV according to an embodiment of the disclosure, where Type takes 1 byte and the value is to be assigned by the IANA, indicating that the sub-sub-TLV is the IP DS sub-sub-TLV: Length takes 1 byte and the value is 2: DS Begin takes 1 byte, represents a begin value of the range of the TCs, and the value cannot exceed DS End; and DS End takes 1 byte and represents an end value of the range of the TCs. The IP traffic is allowed to use the designated tunnel encapsulation in the Tunnel Encapsulation TLV only if the DS of the IP traffic (e.g., the TOS field of the IPV4 header or the TC field of the IPV6 header) is within the above range.

b) IP Source Address Range Sub-Sub-TLV

The IP Source Address range sub-sub-TLV is configured to represent the range of source addresses that the traffic needs to be matched. FIG. 6 is a schematic diagram of a format of an IP Source Address Range sub-sub-TLV according to an embodiment of the disclosure, where Type takes 1 byte and the value is to be assigned by the IANA, indicating that the sub-sub-TLV is the IP Source Address Range sub-sub-TLV: Length takes 1 byte and the value is 6 or 18: and Flags takes 1 byte and contains some flags. Currently, only V-Flag is defined, 0 represents a 32-bit IPv4 Prefix in the Prefix field and 1 represents a 128-bit IPv6 Prefix in the Prefix field: Prefix Length takes 1 byte and represents the length of the prefix in the Prefix field; and Prefix is an IPV4 Prefix that takes 4 bytes, or an IPV6 Prefix that takes 16 bytes. The IP traffic is allowed to use the designated tunnel encapsulation in the Tunnel Encapsulation TLV only if the source address of the IP traffic is within the range of Prefix.

c) IP Destination Address (DA) Range Sub-Sub-TLV

The IP DA Range sub-sub-TLV is configured to represent the ranges of DAs that the traffic needs to be matched, and the format is the same as that of the IP Source Address Range sub-sub-TLV.

d) IP Protocol Number Sub-Sub-TLV

The IP DS sub-sub-TLV is configured to represent the range of protocol numbers that the traffic needs to be matched. FIG. 7 is a schematic diagram of a format of an IP Protocol Number sub-sub-TLV according to an embodiment of the disclosure, where Type takes 1 byte and the value is to be assigned by the IANA, indicating that the sub-sub-TLV is the IP Protocol Number sub-sub-TLV: Length takes 1 byte and the value is 2: Protocol Begin takes 1 byte, represents a begin value of the range of the protocol numbers, and the value cannot exceed Protocol End: and Protocol End takes 1 byte and represents an end value of the range of the protocol numbers. The IP traffic is allowed to use the designated tunnel encapsulation in the Tunnel Encapsulation TLV only if the protocol number of the IP traffic (e.g., the Protocol field of the IPv4 header or the Next Header field of the IPV6 header) is within the above range.

e) Transport Source Port Range Sub-Sub-TLV

The Transport Source Port Range sub-sub-TLV is configured to represent the range of source port numbers that the traffic needs to be matched. FIG. 8 is a schematic diagram of a format of a Transport Source Port Range sub-sub-TLV according to an embodiment of the disclosure, where Type takes 1 byte and the value is to be assigned by the IANA, indicating that the sub-sub-TLV is the Transport Source Port Range sub-sub-TLV: Length takes 1 byte and the value is 6: Port Begin takes 1 byte, represents a begin value of the range of the source port numbers, and the value cannot exceed Port End: and Port End takes 1 byte, represents an end value of the range of the source port numbers. The IP traffic is allowed to use the designated tunnel encapsulation in the Tunnel Encapsulation TLV only if a transport layer source port number of the traffic (e.g., a source port of a Transmission Control Protocol (TCP) or User Datagram Protocol (UDP)) is within the above range.

f) Transport Destination Port Range Sub-Sub-TLV

The Transport Destination Port Range sub-sub-TLV is configured to represent the ranges of destination port numbers that the traffic needs to be matched, and the format is the same as that of the Transport Source Port Range sub-sub-TLV.

g) Similarly, traffic matching conditions corresponding to an Ethernet frame may be defined, such as the range of source MACs, the range of destination MACs, the range of VLAN IDs, and the range of PCPs. The principle is similar to the traffic matching conditions corresponding to an IP packet, which will not be elaborated herein.

For better understanding of the tunnel encapsulation of the specific virtual network contained in the tunnel encapsulation attribute, the specific implementation of draft-ietf-idr-tunnel-encaps-22 in the flow classification feature value contained in the tunnel encapsulation attribute is described as follows.

In the Tunnel Encapsulation TLV defined by draft-ietf-idr-tunnel-encaps-22, a new Virtual Network Sub-TLV is optional and configured to represent the specific virtual network, namely a tunnel associated with the designated tunnel encapsulation in the Tunnel Encapsulation TLV, which is a tunnel in the specific virtual network. FIG. 9 is a schematic diagram of a format of a Virtual Network Sub-TLV according to an embodiment of the disclosure, where Type takes 1 byte and the value is to be assigned by the IANA, indicating that the Sub-TLV is the Virtual Network Sub-TLV: Length takes 1 byte and the value is 6; and Flags takes 1 byte and defines some flags. Currently, only I-Flag is defined, which is only used when the Slice ID is designated in the Virtual Network Sub-TLV. When I-Flag is 1, it represents that the Slice ID needs to be carried in a tunnel header corresponding to the tunnel encapsulation attribute encapsulated by a service packet of a forwarding plane, otherwise it is not needed. Algorithm takes 1 byte, represents a specific IGP algorithm, and the value refers to an "IGP Algorithm Types" registry of the IANA. For example, 0) represents a Shortest Path First (SPF) algorithm based on link metric, 1 represents a Strict SPF algorithm based on link metric, and 128 to 255 represent Flexible Algorithms defined by a user. The MT ID takes 2 bytes and represents a specific IGP topology, and the meaning refers to an MT ID in RFC5120 or MT-ID in RFC4915. The Slice ID takes 2 bytes and represents a specific slice, namely an Internet Engineering Task Force (IETF) network slice defined in draft-ietf-teas-ietf-network-slices-01.

In most cases, only one of the Algorithm, MT ID, and Slice ID needs to be set, and in rare cases, they may also be set at the same time, and the value is 0 when not set.

The Virtual Network Sub-TLV contained in the Tunnel Encapsulation TLV is used in conjunction with other Sub-TLVs to specify the tunnel encapsulation information corresponding to the tunnel in the specific virtual network. For example, when the Tunnel Encapsulation TLV has a Tunnel Type of 7 (representing IP in IP) and contains the Virtual Network Sub-TLV and a defined Tunnel Egress Endpoint Sub-TLV, it represents that the service packet is encapsulated in the IP tunnel to the designated Tunnel Egress Endpoint IP in the designated virtual network for transmission.

For better understanding of the specific SR SID contained in the tunnel encapsulation attribute, the specific implementation of draft-ietf-idr-tunnel-encaps-22 in tunnel encapsulation of the specific SR SID contained in the tunnel encapsulation attribute is described as follows.

Considering that the SR (referring to RFC8402) SID may provide an BE forwarding path based on SR (denoted as SR-BE), and during the assignment of the SID, different virtual networks may be distinguished to assign different SIDs. Therefore, the designated SID contained in the tunnel encapsulation attribute may be used as another option to encapsulate the service packet in an SR-BE tunnel of the specific virtual network. In the industry, SR, when applied to a Multi-Protocol Label Switching (MPLS) data plane, is called SR-MPLS, and when applied to an IPv6 data plane, is called SRv6.

In the embodiment, a new Tunnel Type=SR-BE is added into a "BGP Tunnel Encapsulation Attribute Tunnel Types" Registry of the IANA to represent an SR-BE tunnel. In order to describe encapsulation information of the SR-BE tunnel, the SR-BE Encapsulation Sub-TLV needs to be added into the Tunnel Encapsulation TLV. FIG. 10 is a schematic diagram of a format of an SR-BE Encapsulation Sub-TLV according to an embodiment of the disclosure, where Type takes 1 byte and the value is 1. The draft-ietf-idr-tunnel-encaps-22 specifies that the values of Types of the Encapsulation Sub-TLVs of the tunnels of all Tunnel Types are 1, and the Sub-TLV is interpreted in conjunction with the Tunnel Type at the same time. Length takes 1 byte and the value is 6. Flags takes 1 byte and defines some flags. Currently, only D-Flag is defined to represent the type of the SID. When D-Flag is 0, it represents that a 4-byte SR-MPLS SID in the SID field is an index: and when it is 1, it represents a 16-byte SRv6 SID in the SID field. The SID is a 4-byte SR-MPLS SID or 16-byte SRv6 SID. When the SID is the SR-MPLS SID, it is an index that needs to use a Segment Routing Global Block (SRGB) offset of a downstream node to obtain an outgoing label, which is a label of the SR-BE tunnel of SR-MPLS. When the SID is the SRv6 SID, it is filled in the DA field of the IPV6 header corresponding to the SR-BE tunnel of the SRv6.

It is apparent that the described embodiments are only a part of the embodiments of the disclosure, and not all of them. For better understanding of the message sending method and the message receiving method, the above process is explained in combination with the embodiments below, and is not intended to limit the technical solutions of the disclosure, optionally.

Embodiment 1

Figure 11:
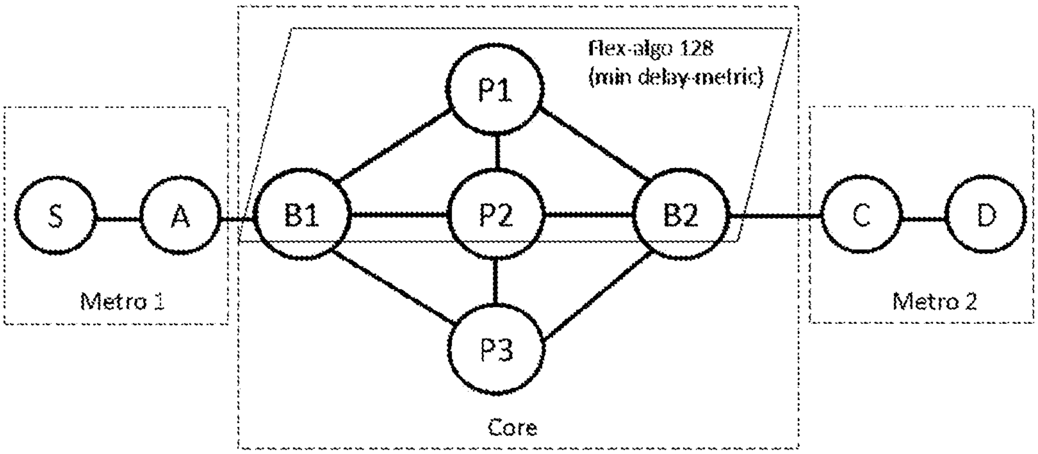
FIG. 11 is a schematic diagram of deployment of an IGP Flex-algo in a backbone network according to an embodiment of the disclosure.

The embodiment describes a most concise network slice deployment solution that maps a corresponding tunnel exit IP address according to the TC. In the backbone network of some operators, the network administrator does not want to deploy a large number of traffic engineering paths in the network, but wants to automatically select the appropriate path from the network for forwarding according to the features of the service packet. FIG. 11 is a schematic diagram of deployment of an IGP Flex-algo in a backbone network according to an embodiment of the disclosure. In the network shown in FIG. 11, the network administrator chooses to deploy the IGP Flex-algo in the IPV6-only backbone network, and create a Flex-algo plane based on a low Delay metric calculation path, so that the traffic with higher TC is forwarded along the Flex-algo plane, and ordinary traffic continues being forwarded along the physical network.

It is to be noted that a node B2 and a node B1 in the embodiment respectively correspond to the egress node and the ingress node of the above solutions.

Since the backbone network in the embodiment is the IPV6-only network, no SR is deployed. Therefore, the method of draft-ietf-lsr-ip-flexalgo-00 may be used to create a Flex-algo 128 plane shown in the figure. As shown in FIG. 11, the nodes B1, P1, P2, and B2 and interconnected links thereof are added into the Flex-algo 128 plane, and the whole backbone physical network may be regarded as a plane corresponding to algorithm 0. In the embodiment, it is assumed that there are two Loopback routes on the node B2, namely Loopback-B2 and Loopback-B200. Loopback-B2 is associated with algorithm 0, and Loopback-B200 is associated with algorithm 128. Then, on the node B1, a routing forwarding path to Loopback-B2 will be a forwarding path calculated by the minimum IGP metric in the physical network, and a routing forwarding path to Loopback-B200 will be a forwarding path calculated by the minimum Delay metric in the Flex-algo 128 plane.

In order to support the mutual access of different levels of services across metro areas, for example, a node S of Metro 1 needs to send an IPV6 data packet to a node D of Metro 2 in FIG. 11, and then the node S needs to learn the routing reachability information to the node D. It is assumed that there is a local route denoted as Prefix-D on the node D, which is notified in Metro 2. A node C may directly notify a node B2 of Prefix-D or a certain aggregated prefix with a shorter length through the BGP. For simplicity of description, the embodiment directly assumes that Prefix-D is notified directly.

When receiving a routing notification corresponding to Prefix-D from the outside of a backbone domain, the node B2 continues notifying a boundary node B1 of the backbone domain through the BGP. The node B2 does not pay attention to the differences in the notified Prefix (whether for Prefix-D or other Prefix-D), and only needs to configure a simple local policy to add the tunnel encapsulation attribute to the BGP update message that continues being notified, which includes two tunnel encapsulation options, namely two Tunnel Encapsulation TLVs, as follows.

The first Tunnel Encapsulation TLV has the Tunnel Type of IP in IP, and contains a Tunnel Egress Endpoint Sub-TLV, where the Address field is filled in Loopback-B2, and the Flow Classification Sub-TLV and the IP DS sub-sub-TLV, where [DS Begin, DS End] is assumed to be [0, 3] to represent a low priority packet.

The second Tunnel Encapsulation TLV has the Tunnel Type of IP in IP, and contains the Tunnel Egress Endpoint Sub-TLV, where the Address field is filled in Loopback-B200, and the Flow Classification Sub-TLV and the IP DS sub-sub-TLV, where [DS Begin, DS End] is assumed to be [4, 8] to represent a high priority packet.

When continuing notifying the node B1 of the BGP update message, the node B2 may change BGP Next-hop in the message to itself, which is always set to an address where a BGP session is established with the node B1, such as Loopback-B2. This is independent of the Tunnel Egress Endpoint Sub-TLV in the tunnel encapsulation attribute carried in the BGP update message.

After receiving the routing notification, the node B1 may maintain same to the routing entry of Prefix-D, which contains the tunnel encapsulation attribute information and specifically contains the above two tunnel encapsulation options.

The node B1 continues notifying the boundary node A of Metro 1 through the BGP, and also changes the BGP Next-hop in the BGP update message to itself. It is to be noted that, in the embodiment, at this time, B1 needs to strip the tunnel encapsulation attribute in the BGP update message before notifying the node A.

It is to be noted that, in some scenarios, B1 may carry a new tunnel encapsulation attribute to specify the tunnel from the neighbor node to B1 for packet forwarding when continuing notifying the neighbor node of the BGP update message. In such scenarios, the tunnel encapsulation is spliced one by one. In the embodiment, since the tunnel only needs to be specified in the backbone network, and the configuration on the node B1 is also desired to be as simple as possible, a simple local strategy may be used on the node B1. When the BGP Next-hop in the BGP update message that continues being notified is changed to itself, the old tunnel encapsulation attribute is removed before being notified.

In Metro 1, the node A continues notifying the node S of Prefix-D through the IGP or BGP.

Next, the data packets sent by the node S to the node D are observed. It is assumed that the data packets are two IPv6 packets, denoted as Packet 1 and Packet 2. The destination IP addresses of the two packets are local addresses on the node D, denoted as IP-D (the local addresses of other nodes are also denoted with similar symbols unless otherwise specified), and the above Prefix-D routing entry may be matched on every node in the network. It is assumed that the TC in the IPV6 Header of Packet 1 is 0, and the TC in the IPV6 Header of Packet 2 is 7. That is:

Packet1:

IPV6 Header: DA=IP-D, SA=IP-S, Traffic Class=0

Packet2:

IPv6 Header: DA=IP-D, SA=IP-S, Traffic Class=7

When the above packets arrive at the boundary node B1 of the backbone network, they hit the maintained routing entry Prefix-D, and an outer IP tunnel is encapsulated for the packets according to the tunnel encapsulation attribute information contained in the routing entry. At this time, since the TC of Packet 1 is 0, the DA of the encapsulated outer IPV6 Header is Loopback-B2. The TC of Packet 2 is 7, the DA of the encapsulated outer IPv6 Header is Loopback-B200. That is:

Packet1:

Outer IPv6 Header: DA=Loopback-B2, SA=IP-B1

Inner IPv6 Header: DA=IP-D, SA=IP-S, Traffic Class=0

Packet2:

Outer IPv6 Header: DA=Loopback-B200, SA=IP-B1

Inner IPV6 Header: DA=IP-D, SA=IP-S, Traffic Class=7

Then, the above two packets are forwarded to the destination node B2 along the physical topology and the Flex-algo 128 plane respectively, so as to be processed differently in the backbone network. The node B2 finally forwards the above two packets to Metro 2.

In the embodiment, the IP DS sub-sub-TLV contained in the Flow Classification Sub-TLV may be replaced with other sub-sub-TLVs, but only the traffic matching conditions are changed, and the processing processes are similar.

In the embodiment, the Flex-algo may be replaced with multiple IGP processes (that is, multiple IGP instances are deployed in the physical network, and each link belongs to only one IGP instance), that is, the above Loopback-B2 and Loopback-B200 are associated with different IGP processes, and the processing processes are also similar.

Embodiment 2

The embodiment still takes FIG. 11 as an example, assumes that the backbone network has been upgraded to support SRv6, and describes an SRv6 SID mapped to the corresponding tunnel exit according to the TC. The network administrator chooses to deploy the IGP Flex-algo in the backbone network supporting SRv6, and creates the Flex-algo plane based on the low Delay metric calculation path, so that the traffic with higher TC is forwarded along the Flex-algo plane, and ordinary traffic continues being forwarded along the physical network.

Since the backbone network in the embodiment is an SRv6 network, the method of draft-ietf-lsr-flex-algo-14 may be used to create the Flex-algo 128 plane shown in the figure. As shown in FIG. 11, the nodes B1, P1, P2, and B2 and interconnected links thereof are added into the Flex-algo 128 plane, and the whole backbone physical network may be regarded as a plane corresponding to algorithm 0. In the embodiment, it is assumed that there are two SRv6 Locators on the node B2, namely LOC-B2 and LOC-B200, LOC-B2 is associated with algorithm 0, and LOC-B200 is associated with algorithm 128. Then, on the node B1, a routing forwarding path to LOC-B2 will be a path calculated by the minimum IGP metric in the physical network, and a routing forwarding path to LOC-B200 will be a forwarding path calculated by the minimum Delay metric in the Flex-algo 128 plane. In addition, it is assumed that SID-B2 is assigned in LOC-B2 and SID-B200 is assigned in LOC-B200, the two SIDs may be END SIDs having an Ultimate Segment Decapsulation (USD) flavor, or an END.DT6 SID configured to carry a Global IPv6 packet, referring to RFC8986 and draft-ietf-bess-srv6-services-07.

In order to support the mutual access of different levels of services across metro areas, for example, the node S of Metro 1 needs to send an IPV6 data packet to the node D of Metro 2 in FIG. 11, and then the node S needs to learn the routing reachability information to the node D. It is assumed that there is a local route denoted as Prefix-D on the node D, which is notified in Metro 2. The node C may directly notify the node B2 of Prefix-D or a certain aggregated prefix with a shorter length through the BGP. For simplicity of description, the embodiment directly assumes that Prefix-D is notified directly.

When receiving the routing notification corresponding to Prefix-D from the outside of the backbone domain, the node B2 continues notifying the boundary node B1 of the backbone domain through the BGP. The node B2 does not pay attention to the differences in the notified Prefix (whether for Prefix-D or other Prefix-D), and only needs to configure a simple local policy to add the tunnel encapsulation attribute to the BGP update message that continues being notified, which includes two tunnel encapsulation options, namely two Tunnel Encapsulation TLVs, as follows.

The first Tunnel Encapsulation TLV has the Tunnel Type of SR-BE, and contains the SR-BE Encapsulation Sub-TLV, where D-Flag is set to be 1 and the SID is SID-B2, and the Flow Classification Sub-TLV and the IP DS sub-sub-TLV, where [DS Begin, DS End] is assumed to be [0, 3] to represent the low priority packet.

The second Tunnel Encapsulation TLV has the Tunnel Type of SR-BE, and contains the SR-BE Encapsulation Sub-TLV, where D-Flag is set to be 1 and the SID is SID-B200, and the Flow Classification Sub-TLV and the IP DS sub-sub-TLV, where [DS Begin, DS End] is assumed to be [4, 8] to represent the high priority packet.

When continuing notifying the node B1 of the BGP update message, the node B2 may change BGP Next-hop in the message to itself, which is always set to an address where the BGP session is established with the node B1, such as Loopback-B2.

After receiving the routing notification, the node B1 may maintain same to the routing entry of Prefix-D, which contains the tunnel encapsulation attribute information and specifically contains the above two tunnel encapsulation options.

Node B1 continues notifying the boundary node A of Metro 1 through the BGP, and also changes the BGP Next-hop in the BGP update message to itself. It is to be noted that, in the embodiment, at this time, B1 needs to strip the tunnel encapsulation attribute in the BGP update message before notifying the node A.

In Metro 1, the node A continues notifying the node S of the Prefix-D through the IGP or BGP. Next, two IPV6 data packets Packet 1 and Packet 2 (same as Embodiment 1) sent by the node S to the node D are observed.

Packet1:

IPv6 Header: DA=IP-D, SA=IP-S, Traffic Class=0

Packet2:

IPv6 Header: DA=IP-D, SA=IP-S, Traffic Class=7

When the above packets arrive at the boundary node B1 of the backbone network, they hit the maintained routing entry Prefix-D, and an outer IPV6 SR-BE tunnel is encapsulated for the packets according to the tunnel encapsulation attribute information contained in the routing entry. At this time, since the TC of Packet1 is 0, the DA of the encapsulated outer IPV6 Header is SID-B2. The TC of Packet2 is 7, the DA of the encapsulated outer IPv6 Header is SID-B200. That is:

Packet1:

Outer IPv6 Header: DA=SID-B2, SA=IP-B1

Inner IPv6 Header: DA=IP-D, SA=IP-S, Traffic Class=0

Packet2:

Outer IPv6 Header: DA=SID-B200, SA=IP-B1

Inner IPv6 Header: DA=IP-D, SA=IP-S, Traffic Class=7

Then, the above two packets are forwarded to the destination node B2 along the physical topology and the Flex-algo 128 plane respectively, so as to be processed differently in the backbone network. The node B2 finally forwards the above two packets to Metro 2.

In the embodiment, the IP DS sub-sub-TLV contained in the Flow Classification Sub-TLV may be replaced with other sub-sub-TLVs, but only the traffic matching conditions are changed, and the processing processes are similar.

The SRv6 SID in the embodiment may be replaced with the SR-MPLS SID, and the processing processes are similar, except that the encapsulated outer IPV6 Header of the encapsulation is replaced with an MPLS label stack.

Embodiment 3

The embodiment still takes FIG. 11 as an example, describes a path mapped to the designated algorithm according to the TC, and requires the ingress node to combine the designated algorithm with the BGP Next-hop of the BGP update message or the designated tunnel exit node to indirectly determine the tunnel encapsulation to be used. In this way, the tunnel selection of the ingress node is more flexible, and the BGP update is more concisely notified. It is assumed that as described above, the Flex-algo 128 plane is created in the backbone network for high priority services.

When receiving the routing notification corresponding to Prefix-D from the outside of the backbone domain, the node B2 continues notifying the boundary node B1 of the backbone domain through the BGP. The node B2 does not pay attention to the differences in the notified Prefix (whether for Prefix-D or other Prefix-D), and only needs to configure a simple local policy to add the tunnel encapsulation attribute to the BGP update message that continues being notified, which includes two tunnel encapsulation options, namely two Tunnel Encapsulation TLVs, as follows.

The first Tunnel Encapsulation TLV has the Tunnel Type of Any-Encapsulation, and contains a Virtual Network Sub-TLV, where the algorithm, the MT ID and the Slice ID are all set to be 0, and the Flow Classification Sub-TLV and the IP DS sub-sub-TLV, where [DS Begin, DS End] is assumed to be [0, 3] to represent the low priority packet.

The second Tunnel Encapsulation TLV has the Tunnel Type of Any-Encapsulation, and contains the Virtual Network Sub-TLV, where the algorithm is set to be 128, and the MT ID and the Slice ID are both set to be 0, and the Flow Classification Sub-TLV and the IP DS sub-sub-TLV, where [DS Begin, DS End] is assumed to be [4, 8] to represent the high priority packet.

When continuing notifying the node B1 of the BGP update message, the node B2 may change BGP Next-hop in the message to itself, which is always set to an address where the BGP session is established with the node B1, such as Loopback-B2.

After receiving the routing notification, the node B1 may maintain same to the routing entry of Prefix-D, which contains the tunnel encapsulation attribute information and specifically contains the above two tunnel encapsulation options. Since the Tunnel Type is Any-Encapsulation, the node B1 needs to select the corresponding tunnel according to the perceived actual capabilities in the backbone network. For example, if the backbone network is an SR-MPLS network, it needs to find the Prefix SID assigned by the node B2 to the corresponding algorithm in a link state database according to <algorithm, Loopback-B2> as a key value, and then obtain corresponding MPLS SR-BE forwarding information as the tunnel encapsulation information according to the Prefix SID found. For another example, if the backbone network is an SRv6 network, it needs to find the END SID assigned by the node B2 to the corresponding algorithm in the link state database according to <algorithm, Loopback-B2> as the key value, and then obtain corresponding IPV6 SR-BE forwarding information as the tunnel encapsulation information according to the END SID found.

The other processes are similar to Embodiment 1 and Embodiment 2, which will not be elaborated herein.

Although the tunnel encapsulation described in the embodiment is the path in the Flex-algo plane, in fact, the processing processes are similar when replaced with the IGP MT or Slice ID virtual topology: Especially, there is an enhanced processing process for the Slice ID virtual topology, as detailed in Embodiment 4.

Embodiment 4

The embodiment describes a path mapped to the designated Slice ID according to the TC based on Embodiment 3, and requires the ingress node to combine the designated Slice ID with the BGP Next-hop of the BGP update message or the designated tunnel exit node to indirectly determine the tunnel encapsulation to be used. In this way, the tunnel selection of the ingress node is more flexible, and the BGP update is more concisely notified. It is assumed that a Slice ID 1 virtual topology is created in the backbone network for high priority services.

When receiving the routing notification corresponding to Prefix-D from the outside of the backbone domain, the node B2 continues notifying the boundary node B1 of the backbone domain through the BGP. The node B2 does not pay attention to the differences in the notified Prefix (whether for Prefix-D or other Prefix-D), and only needs to configure a simple local policy to add the tunnel encapsulation attribute to the BGP update message that continues being notified, which includes two tunnel encapsulation options, namely two Tunnel Encapsulation TLVs, as follows.

The first Tunnel Encapsulation TLV has the Tunnel Type of Any-Encapsulation, and contains a Virtual Network Sub-TLV, where the algorithm, the MT ID and the Slice ID are all set to be 0, and the Flow Classification Sub-TLV and the IP DS sub-sub-TLV, where [DS Begin, DS End] is assumed to be [0, 3] to represent the low priority packet.

The second Tunnel Encapsulation TLV has the Tunnel Type of Any-Encapsulation, and contains the Virtual Network Sub-TLV, where the algorithm and the MT ID are set to be 0 the Slice ID is set to be 1, and I-Flag is set to be 1, and the Flow Classification Sub-TLV and the IP DS sub-sub-TLV, where [DS Begin, DS End] is assumed to be [4,8] to represent the high priority packet.

It is to be noted that when the node B2 continues notifying the node B1 of the BGP update message, it may change BGP Next-hop in the message to itself, which is always set to an address where a BGP session is established with the node B1, such as Loopback-B2.

After receiving the routing notification, the node B1 may maintain same to the routing entry of Prefix-D, which contains the tunnel encapsulation attribute information and specifically contains the above two tunnel encapsulation options. Since the Tunnel Type is Any-Encapsulation, the node B1 needs to select the corresponding tunnel according to the perceived actual capabilities in the backbone network. For example, if the backbone network is the SR-MPLS network, it needs to find the Prefix SID assigned by the node B2 to the corresponding Slice ID in the link state database according to <Slice ID, Loopback-B2> as the key value, and then obtain the corresponding MPLS SR-BE forwarding information as the tunnel encapsulation information according to the Prefix SID found. For another example, if the backbone network is the SRv6 network, it needs to find the END SID assigned by the node B2 to the corresponding Slice ID in the link state database according to <algorithm, Loopback-B2> as the key value, and then obtain corresponding IPV6 SR-BE forwarding information as the tunnel encapsulation information according to the END SID found. The forwarding information contained in the forwarding entries corresponding to the SR-MPLS Prefix SIDs or SRv6 END SIDs may be copied from the corresponding forwarding entries in the shared logical topology (for example, multiple Slice IDs may share the same logical topology).

For the tunnel encapsulation attribute that I-Flag is set to be 1, when the tunnel encapsulation attribute is applied to the service packet, the Slice ID needs to be inserted into the encapsulated outer tunnel header. A method of inserting the Slice ID into the IPV6 header may refer to draft-filsfils-spring-srv6-stateless-slice-id-02, and a method of inserting the Slice ID into the MPLS label stack may refer to draft-decraene-mpls-slid-encoded entropy-label-id-01.

It is to be noted that, in all the above embodiments, the method defined by RFC8277 may be used to carry a MPLS Label when Prefix-D is notified, so that the corresponding label entry may be created on the node B1 for Prefix-D. The subsequent data packets sent from the node S to the node D may be label packets. When the packet arrives at the node B1, it is matched with the corresponding label entry, and then the appropriate outer tunnel is packaged for the packet according to the tunnel encapsulation attribute contained in the label entry, which is completely similar to the processing when the routing entry is created on the node B1.

In addition, the above method may be applied to an IP Radio Access Network (IPRAN)/Secret Private Network (SPN) and a metropolitan area network/backbone, which makes up for the defect that the specific virtual network (especially network slice) cannot be specified when notifying a BGP route.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the disclosure substantially or the part making a contribution to the conventional art can be embodied in the form of a software product. The computer software product is stored in a storage medium (such as a Read-Only Memory (ROM)/RAM, a magnetic disk, and a compact disc), including a number of instructions for causing a terminal device (which may be a mobile phone, a computer, a server, or a network device, etc.) to perform the methods described in various embodiments of the disclosure.

The embodiments also provide a message sending apparatus, which is configured to implement the above embodiments and preferred implementations. The embodiments and preferred implementations that have been elaborated will not be repeated here. The term "module" used below can realize a combination of software and/or hardware with an intended function. Although the device described in the following embodiment is preferably realized by software, but by hardware or a combination of software and hardware is also possible and conceived.

Figure 12:
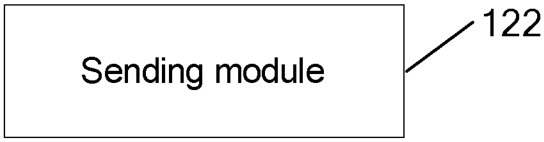
FIG. 12 is a structural block diagram of a message sending apparatus according to an embodiment of the disclosure.

FIG. 12 is a structural block diagram of a message sending apparatus according to an embodiment of the disclosure. The apparatus includes a sending module 122.

The sending module 122 is configured to send a BGP update message to an ingress node to notify the ingress node of routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

Through the above step, the BGP update message containing the designated flow classification feature value and the path information of the designated virtual network is sent to the ingress node to notify the ingress node of the routing reachability information, and then the ingress node may map, to the path of the designated virtual network, the traffic which is sent to the egress node and has the designated flow classification feature value. The problems of inflexibility caused by dependency on a manually configured slice for traffic guidance during network operation and maintenance, etc. are solved, and then the egress node sends the BGP update message to the ingress node to notify the ingress node of the routing reachability information, which makes up for the defect of incapability of specifying the specific virtual network when notifying a BGP route, and achieves automatic slice traffic guidance without depending on static configuration, so that the flexibility is good.

It is to be noted that the flow classification feature value includes at least one of the following: a DS field of an IP header, a source IP address, a destination IP address, a source port number, a destination port number, and a protocol number of the IP header, and an MAC, a destination MAC address, a VLAN ID, and a PCP of an Ethernet frame header.

Further, the DS field of the IP header includes at least one of the following: a TOS field of an IPv4 header, and a TC field of an IPV6 header.

For better understanding, in the embodiment, the flow classification feature value is mainly the DS field of the IP header such as the TOS field of the IPV4 header or the TC field of the IPV6 header in a scenario of network slices. In addition, in other scenarios, the flow classification feature value may also be one of the source IP address, the destination IP address, the source port number, the destination port number, and the protocol number of the IP header, or any combination thereof or any combination with the DS field, and may also be any one of the source MAC, the destination MAC address, the VLAN ID, and the PCP of the Ethernet frame header, or any combination thereof.

Optionally, the path information of the designated virtual network includes at least one of the following: a path to a designated destination node in a designated IGP topology, a path to a designated destination node in a designated Flex-algo plane, a path to a designated destination node in a designated virtual topology corresponding to a designated Slice ID, and a path to a designated SID.

Figure 13:
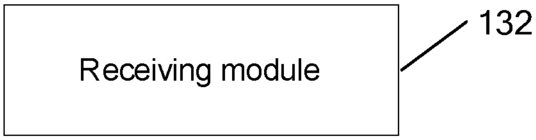
FIG. 13 is a structural block diagram of a message receiving apparatus according to an embodiment of the disclosure.

The embodiments also provide a message receiving apparatus, which is configured to implement the above embodiments and preferred implementations. The embodiments and preferred implementations that have been elaborated will not be repeated here. FIG. 13 is a structural block diagram of a message receiving apparatus according to an embodiment of the disclosure. The apparatus includes a receiving module 132.

The receiving module 132 is configured to receive a BGP update message sent by an egress node to obtain routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

Through the above step, the BGP update message which is sent by the egress node and contains the designated flow classification feature value and the path information of the designated virtual network is received to obtain the routing reachability information, and then the ingress node may map, to the path of the designated virtual network, the traffic which is sent to the egress node and has the designated flow classification feature value. The problems of inflexibility caused by dependency on a manually configured slice for traffic guidance during network operation and maintenance, etc. are solved, and then the BGP update message sent by the egress node is received through the ingress node to obtain the routing reachability information, which makes up for the defect of incapability of specifying the specific virtual network when notifying a BGP route, and achieves automatic slice traffic guidance without depending on static configuration, so that the flexibility is good.

It is to be noted that the flow classification feature value includes at least one of the following: a DS field of an IP header, a source IP address, a destination IP address, a source port number, a destination port number, and a protocol number of the IP header, and an MAC, a destination MAC address, a VLAN ID, and a PCP of an Ethernet frame header.

Further, the DS field of the IP header includes at least one of the following: a TOS field of an IPv4 header, and a TC field of an IPV6 header.

For better understanding, in the embodiment, the flow classification feature value is mainly the DS field of the IP header such as the TOS field of the IPV4 header or the TC field of the IPV6 header in a scenario of network slices. In addition, in other scenarios, the flow classification feature value may also be one of the source IP address, the destination IP address, the source port number, the destination port number, and the protocol number of the IP header, or any combination thereof or any combination with the DS field, and may also be any one of the source MAC, the destination MAC address, the VLAN ID, and the PCP of the Ethernet frame header, or any combination thereof.

Optionally, the path information of the designated virtual network includes at least one of the following: a path to a designated destination node in a designated IGP topology, a path to a designated destination node in a designated Flex-algo plane, a path to a designated destination node in a designated virtual topology corresponding to a designated Slice ID, and a path to a designated SID.

It is to be noted that the receiving module 132 is further configured to create, by the ingress node, a routing entry or a label entry corresponding to the ingress node according to the obtained routing reachability information. The routing entry or the label entry includes: the tunnel encapsulation attribute.

In this embodiment, after receiving the routing reachability information, the ingress node of the network creates the routing entry or the label entry corresponding to the ingress node to maintain the corresponding routing entry or label entry. The routing entry or the label entry contains corresponding tunnel encapsulation attribute information. It is to be noted that the tunnel encapsulation attribute information maintained in a single routing entry or label entry may contain multiple tunnel encapsulation options, such as <flow classification feature value 1, tunnel 1>, <flow classification feature value 2, tunnel 2>, etc.

Further, the receiving module 132 is further configured to obtain, by the ingress node in a case of determining that the traffic is matched with the routing entry or the label entry, a flow classification feature of the traffic, and forward the traffic on the path information of the designated virtual network corresponding to the flow classification feature.

In the embodiment, when the ingress node of the network receives the traffic from a user side, if the routing entry or the label entry is matched and the routing entry or the label entry contains the tunnel encapsulation attribute information, the traffic is further guided to the forwarding path of the designated virtual network for forwarding according to the flow classification feature of the received traffic.

The embodiments of the disclosure also provide a computer readable storage medium, in which a computer program is stored. The computer program is configured to execute, when running, the steps in any of the above method embodiments.

Optionally, in the embodiment, the storage medium may be configured to store the computer program for executing the following step.

At S1, an egress node sends a BGP update message to an ingress node to notify the ingress node of routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

Alternatively, the computer program executes the following step.

At S1, the ingress node receives the BGP update message sent by the egress node to obtain the routing reachability information. The BGP update message includes the tunnel encapsulation attribute, which includes one or more pieces of tunnel encapsulation information, the tunnel encapsulation information including at least one of the following: the designated flow classification feature value and the path information of the designated virtual network, and the tunnel encapsulation information being configured to instruct the ingress node to map, to the path of the designated virtual network, the traffic which is sent to the egress node and has the designated flow classification feature value.

In an exemplary embodiment, the computer readable storage medium may include, but are not limited to, a USB flash disk, an ROM, an RAM, a mobile hard disk, a magnetic disk, a compact disc, and other media capable of storing the computer program.

The specific examples in the embodiment may refer to the above embodiments and the examples described in the exemplary implementations, which will not be elaborated herein.

The embodiments of the disclosure also provide an electronic device, which includes a memory and a processor. The memory stores a computer program. The processor is configured to run the computer program to execute the steps in any of the above method embodiments.

Optionally, in the embodiment, the processor may be configured to execute the following step through the computer program.

At S1, an egress node sends a BGP update message to an ingress node to notify the ingress node of routing reachability information. The BGP update message includes a tunnel encapsulation attribute, which includes one or more pieces of tunnel encapsulation information, the tunnel encapsulation information including at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value.

Alternatively, the processor may be configured to execute the following step through the computer program.

At S1, the ingress node receives the BGP update message sent by the egress node to obtain the routing reachability information. The BGP update message includes the tunnel encapsulation attribute, which includes one or more pieces of tunnel encapsulation information, the tunnel encapsulation information including at least one of the following: the designated flow classification feature value and the path information of the designated virtual network, and the tunnel encapsulation information being configured to instruct the ingress node to map, to the path of the designated virtual network, the traffic which is sent to the egress node and has the designated flow classification feature value.

In an exemplary embodiment, the electronic device may further include a transmission device and an input and output device. The transmission device is connected with the processor, and the input and output device is connected with the processor.

The specific examples in the embodiment may refer to the above embodiments and the examples described in the exemplary implementations, which will not be elaborated herein.

It is apparent that those skilled in the art should appreciate that the above modules and steps of the disclosure may be implemented by a general-purpose computing device, and they may be centralized in a single computing device or distributed on a network composed of multiple computing devices: they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the disclosure is not limited to any designated combination of hardware and software.

The above are only the preferred embodiments of the disclosure and are not intended to limit the disclosure. For those skilled in the art, the disclosure may have various modifications and variations. Any modifications, equivalent replacements, improvements and the like made within the principle of the disclosure shall fall within the scope of protection of the disclosure.

What is claimed is:

1. A message sending method, comprising:

sending, by an egress node, a Border Gateway Protocol (BGP) update message to an ingress node to notify the ingress node of routing reachability information, wherein the BGP update message comprises a tunnel encapsulation attribute, which comprises one or more pieces of tunnel encapsulation information, the tunnel encapsulation information comprising at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value;

wherein the path information of the designated virtual network comprises at least one of the following: a path to a designated destination node in a designated Interior Gateway Protocol (IGP) topology, a path to a designated destination node in a designated Flexible Algorithm (Flex-algo) plane, a path to a designated destination node in a designated virtual topology corresponding to a designated Slice Identifier (ID), and a path to a designated Segment Identifier (SID).

2. The method according to claim 1, wherein the flow classification feature value comprises at least one of the following: a Differentiated Services (DS) field of an Internet Protocol (IP) header, a source IP address, a destination IP address, a source port number, a destination port number, and a protocol number of the IP header, and a source Media Access Control (MAC), a destination MAC address, a Virtual Local Area Network Identity Document (VLAN ID), and a Priority Code Point (PCP) of an Ethernet frame header.

3. The method according to claim 2, wherein the DS field of the IP header comprises at least one of the following: a Type of Service (TOS) field of an Internet Protocol Version 4 (IPv4) header, and a Traffic Class (TC) field of an Internet Protocol Version 6 (IPv6) header.

4. A message receiving method, comprising:

receiving, by an ingress node, a Border Gateway Protocol (BGP) update message sent by an egress node to obtain routing reachability information, wherein the BGP update message comprises a tunnel encapsulation attribute, which comprises one or more pieces of tunnel encapsulation information, the tunnel encapsulation information comprising at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value;

wherein the path information of the designated virtual network comprises at least one of the following: a path to a designated destination node in a designated Interior Gateway Protocol (IGP) topology, a path to a designated destination node in a designated Flexible Algorithm (Flex-algo) plane, a path to a designated destination node in a designated virtual topology corresponding to a designated Slice Identifier (ID), and a path to a designated Segment Identifier (SID).

5. The method according to claim 4, wherein the flow classification feature value comprises at least one of the following: a Differentiated Services (DS) field of an Internet Protocol (IP) header, a source IP address, a destination IP address, a source port number, a destination port number, and a protocol number of the IP header, and a source Media Access Control (MAC), a destination MAC address, a Virtual Local Area Network Identity Document (VLAN ID), and a Priority Code Point (PCP) of an Ethernet frame header.

6. The method according to claim 5, wherein the DS field of the IP header comprises at least one of the following: a Type of Service (TOS) field of an Internet Protocol Version 4 (IPv4) header, and a Traffic Class (TC) field of an Internet Protocol Version 6 (IPv6) header.

7. The method according to claim 4, wherein after receiving, by the ingress node, the BGP update message sent by the egress node to obtain the routing reachability information, the method further comprises:

creating, by the ingress node, a routing entry or a label entry corresponding to the ingress node according to the obtained routing reachability information, wherein the routing entry or the label entry comprises: the tunnel encapsulation attribute.

8. The method according to claim 7, wherein after creating, by the ingress node, the routing entry or the label entry corresponding to the ingress node according to the obtained routing reachability information, the method further comprises:

in a case of determining that the traffic is matched with the routing entry or the label entry, obtaining, by an ingress node, a flow classification feature of the traffic, and forwarding the traffic on the path information of the designated virtual network corresponding to the flow classification feature.

9. A message sending apparatus, comprising:

a sending module, configured to send a Border Gateway Protocol (BGP) update message to an ingress node to notify the ingress node of routing reachability information, wherein the BGP update message comprises a tunnel encapsulation attribute, which comprises one or more pieces of tunnel encapsulation information, the tunnel encapsulation information comprising at least one of the following: a designated flow classification feature value and path information of a designated virtual network, and the tunnel encapsulation information being configured to instruct the ingress node to map, to a path of the designated virtual network, traffic which is sent to the egress node and has the designated flow classification feature value;

wherein the path information of the designated virtual network comprises at least one of the following: a path to a designated destination node in a designated Interior Gateway Protocol (IGP) topology, a path to a designated destination node in a designated Flexible Algorithm (Flex-algo) plane, a path to a designated destination node in a designated virtual topology corresponding to a designated Slice Identifier (ID), and a path to a designated Segment Identifier (SID).

10. A non-transitory computer readable storage medium, storing a program, wherein when running, the program is configured to perform the method as claimed in claim 1.

11. An electronic device, comprising a memory and a processor, wherein the memory stores a computer program, and the processor is configured to execute the computer program to perform the method as claimed in claim 1.

12. An electronic device, comprising a memory and a processor, wherein the memory stores a computer program, and the processor is configured to execute the computer program to perform the method as claimed in claim 2.

13. An electronic device, comprising a memory and a processor, wherein the memory stores a computer program, and the processor is configured to execute the computer program to perform the method as claimed in claim 3.

14. An electronic device, comprising a memory and a processor, wherein the memory stores a computer program, and the processor is configured to execute the computer program to perform the method as claimed in claim 4.

15. An electronic device, comprising a memory and a processor, wherein the memory stores a computer program, and the processor is configured to execute the computer program to perform the method as claimed in claim 5.

16. An electronic device, comprising a memory and a processor, wherein the memory stores a computer program, and the processor is configured to execute the computer program to perform the method as claimed in claim 6.

* * * * *